(12) United States Patent
Sejalon

(10) Patent No.: US 12,459,304 B2
(45) Date of Patent: Nov. 4, 2025

(54) TIRE FOR A MIXED-USE AGRICULTURAL VEHICLE

(71) Applicant: COMPAGNIE GENERALE DES ETABLISSEMENTS MICHELIN, Clermont-Ferrand (FR)

(72) Inventor: Olivier Sejalon, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 170 days.

(21) Appl. No.: 18/285,299

(22) PCT Filed: Mar. 28, 2022

(86) PCT No.: PCT/FR2022/050574
§ 371 (c)(1),
(2) Date: Oct. 2, 2023

(87) PCT Pub. No.: WO2022/214750
PCT Pub. Date: Oct. 13, 2022

(65) Prior Publication Data
US 2024/0181813 A1    Jun. 6, 2024

(30) Foreign Application Priority Data

Apr. 9, 2021 (FR) .................................... 2103624

(51) Int. Cl.
*B60C 11/03* (2006.01)
*B60C 11/13* (2006.01)
(52) U.S. Cl.
CPC ....... *B60C 11/1307* (2013.01); *B60C 11/0311* (2013.01); *B60C 11/033* (2013.01);
(Continued)

(58) Field of Classification Search
CPC ............... B60C 11/0311; B60C 11/033; B60C 11/1353; B60C 11/1307; B60C 2011/036; B60C 2011/0313
See application file for complete search history.

(56) References Cited

U.S. PATENT DOCUMENTS

| 5,127,455 A | 7/1992 | Remick |
| 6,530,404 B1 * | 3/2003 | Rooney ................... B60C 11/13 |
| | | 152/209.19 |

(Continued)

FOREIGN PATENT DOCUMENTS

| JP | 2000 094907 | 4/2000 |
| WO | WO 00/13923 | 3/2000 |

(Continued)

*Primary Examiner* — Steven D Maki
(74) *Attorney, Agent, or Firm* — COZEN O'CONNOR

(57) ABSTRACT

A tire for an agricultural vehicle, having a tread consisting of blocks in pairs separated by voids and arranged, over the width of the tread, in a median row, two intermediate rows and two lateral rows. To obtain compromise between rolling resistance and service life in terms of wear in road use, two consecutive blocks of the median row) are separated by a transverse void with a width (E1) at most 2.5 mm, the mean circumferential slenderness ratio of every block) of the median row is at least 0.95 and at most 1.15, every block of each intermediate row has a leading face) in the circumferential rolling direction tire which forms a mean angle (D2) equal at least to 30° with a radial direction (ZZ') tire, and the mean circumferential slenderness ratio of every block in each lateral row is at most 0.9.

18 Claims, 4 Drawing Sheets

(52) U.S. Cl.
CPC ... *B60C 11/1353* (2013.01); *B60C 2011/0313* (2013.01); *B60C 2011/036* (2013.01); *B60C 2200/08* (2013.01)

(56) References Cited

U.S. PATENT DOCUMENTS

| | | | |
|---|---|---|---|
| 2013/0000805 A1* | 1/2013 | Oodaira | B60C 11/1263 152/209.1 |
| 2022/0194132 A1* | 6/2022 | Perrin | B60C 11/033 |
| 2022/0355559 A1* | 11/2022 | Ferri | B29D 30/0606 |

FOREIGN PATENT DOCUMENTS

| | | | | |
|---|---|---|---|---|
| WO | WO 2020 201028 | | 10/2020 | |
| WO | WO-2020/201028 A1 * | 10/2020 | | B60C 11/0302 |
| WO | WO-2020/249911 A1 * | 12/2020 | | B29C 33/44 |

* cited by examiner

TIRE FOR A MIXED-USE AGRICULTURAL VEHICLE

RELATED APPLICATIONS

This is a U.S. National Phase Application under 35 USC 371 of International Application PCT/FR2022/050574 filed on Mar. 28, 2022.

This application claims the priority of French application no. FR 2103624 filed Apr. 9, 2021, the entire content of all of which is hereby incorporated by reference.

FIELD OF THE INVENTION

The present invention relates to a tire for an agricultural vehicle for mixed usage, i.e. for use on the road and in the field, such as an agricultural tractor or an agri-industrial vehicle, and relates more particularly to the tread thereof.

BACKGROUND OF THE INVENTION

Like any tire, a tire for an agricultural vehicle comprises a tread intended to come into contact with the ground via a tread surface, the two axial ends of which are connected via two sidewalls to two beads that provide the mechanical connection between the tire and the rim on which it is intended to be mounted.

In the following text and by convention, the circumferential (or longitudinal), axial (or transverse) and radial directions denote a direction tangential to the tread surface and oriented in the direction of rotation of the tire, a direction parallel to the axis of rotation of the tire, and a direction perpendicular to the axis of rotation of the tire, respectively. A radial (or meridian) plane is defined by a radial direction and the axial direction and contains the axis of rotation of the tire. A circumferential plane is defined by a radial direction and a circumferential direction and is therefore perpendicular to the axis of rotation of the tire. The circumferential plane that passes through the middle of the tread is known as the median circumferential plane or equatorial plane.

The tread of a tire for an agricultural vehicle generally comprises a tread pattern consisting of a plurality of raised elements which extend radially outwards from a bearing surface as far as the tread surface and are separated from one another by voids.

In the prior art, a tread for an agricultural vehicle usually comprises tread pattern elements in the form of lugs. A lug generally has an elongate shape that is parallelepipedal overall, is continuous or discontinuous, and is made up of at least one rectilinear or curvilinear portion. A lug is separated from the adjacent lugs by voids or channels. A lug extends axially from a median zone of the tread as far as the axial ends or shoulders thereof. A lug comprises a contact face, positioned in the tread surface and intended to come fully into contact with the ground, a leading face that intersects the tread surface and of which the arris of intersection therewith is intended to be first to come into contact with the ground, a trailing face that intersects the tread surface and of which the arris of intersection therewith is intended to be last to come into contact with the ground, and two lateral faces.

The lugs are distributed circumferentially at a constant or variable spacing, measured between the centre lines of two consecutive lugs, and are generally disposed on each side of the equatorial plane of the tire so as to form a V-shaped pattern, the tip of the V-shaped pattern (or chevron pattern) being intended to be the first part to enter the contact patch in which contact is made with the ground. The lugs generally exhibit symmetry with respect to the equatorial plane of the tire, usually with a circumferential offset between the two rows of lugs, obtained by one half of the tread being rotated about the axis of the tire with respect to the other half of the tread.

A tire for an agricultural vehicle is intended to run over various types of ground such as the more or less compact soil of the fields, unmade tracks providing access to the fields, and the tarmacked surfaces of roads. Bearing in mind the diversity of use, in the field and on the road, a tire for an agricultural vehicle needs to offer a performance compromise between traction in the field on loose ground, resistance to chunking, resistance to wear on the road, resistance to forward travel, and vibrational comfort on the road, this list not being exhaustive.

When the agricultural vehicle is used predominantly on the road, and the distance covered on the road represents for example 80% of the total distance covered both on the road and in the field, the road performance of the tire becomes the most important. The tire, originally designed with the aim of field efficiency, must also have high road performance, in particular in terms of energy efficiency and service life with respect to wear. Energy efficiency means a significant contribution to the fuel economy of the vehicle thanks to the limited resistance to forward travel, in particular rolling resistance. With regard to wear on the road, the tire must also allow a high road mileage thanks to a wear rate which is not too rapid, and to controlled forms of tread wear.

However, the search for an optimum compromise in road use between rolling resistance and service life in terms of wear, must not cause a reduction in adhesion on braking on the road, which must remain at a level compatible with the required safety demands while guaranteeing a braking distance which is short as possible. In fact, it is acknowledged that it is difficult to simultaneously improve rolling resistance, service life and adhesion. To reduce rolling resistance, it is useful to reduce the hysteresis of the rubbery materials constituting the tread, i.e. reduce their heat dissipation capacity, but on the other hand this reduces adhesion during braking. Similarly, increasing the volume of the wearing material of the tread allows an increase in service life but at the risk of increasing rolling resistance.

Also, the search for a compromise in road usage performance previously described must not lead to a loss of field performance such as traction and floating capacity, i.e. the ability not to bog down in the soil.

SUMMARY OF THE INVENTION

Consequently, the inventors have set themselves the objective of proposing an optimal compromise between rolling resistance and service life of a tire for an agricultural vehicle in road use, without degradation of adhesion in braking on the road nor essential performance in the field such as traction and flotation capacity.

This object is achieved according to the invention by a tire for an agricultural vehicle, comprising a tread with an axial width and consisting of pairs of blocks separated by voids and arranged, over the width of the tread, in a median row, two intermediate rows and two lateral rows, the voids being either transverse voids which form an angle at least equal to 60° with a circumferential direction of the tire, or circumferential voids which form an angle at most equal to 30° with the circumferential direction, the median row being centred on a median circumferential plane of the tire, the two intermediate rows being positioned axially on either side of the median row and separated therefrom by circumferential voids, and the two lateral rows being positioned respectively axially outside an intermediate row and separated therefrom by a circumferential void, each median row, intermediate row and lateral row comprising a circumferential distribution of pairs of blocks separated by transverse voids and each having a mean radial height, a mean circumferential length and a mean circumferential slenderness ratio defined as the ratio between the mean radial height and the mean circumferential length of the block, the blocks of a same lateral row extending axially towards the outside in the extension of the blocks of the adjacent intermediate row, such that any set of two blocks of the lateral row and intermediate row respectively, in the extension of one another, forms a lug, two consecutive blocks of the median row being separated by a transverse void with a width equal at most to 2.5 mm, the mean circumferential slenderness ratio of every block in the median row being equal to at least 0.95 and at most 1.15, every block of each intermediate row comprising a leading face in the circumferential rolling direction of the tire, which forms a mean angle at least equal to 30° with a radial direction of the tire, and the mean circumferential slenderness ratio of every block of each lateral row being at most equal to 0.9.

The tread of a tire according to the invention comprises tread pattern elements which are not traditional lugs extending axially from a median zone of the tread to its axial ends or shoulders, but blocks distributed over the width of the tread.

These blocks are arranged in five circumferential rows: a median row, two intermediate rows axially positioned on either side of the median row, and two lateral rows axially positioned respectively on the outside of an intermediate row. However, the arrangement of the respective blocks of a lateral row and of the adjacent intermediate row constitutes a system of partial lugs.

A lug comprises a contact face, positioned in the tread surface and intended to come fully into contact with the ground, a leading face that intersects the tread surface and of which the arris of intersection therewith is intended to be first to come into contact with the ground, a trailing face that intersects the tread surface and of which the arris of intersection therewith is intended to be last to come into contact with the ground, and two lateral faces. The respective leading and trailing faces, not necessarily contained in a plane, are generally characterized by the mean angle it forms with a radial direction of the tire.

Every block may be geometrically characterized by a radial height H in a radial direction, an axial width A in an axial direction, and a circumferential length B in a circumferential direction. These three dimensions H, A and B are mean values measured on the block. Generally, the axial width and the circumferential length vary over the height of the tread pattern element: they may for example reduce from the bearing surface at the base of the void up to the tread because of the slope of the faces of the block. In the case of a radial tire for a driven wheel of an agricultural tractor, the radial height H is generally at least equal to 50 mm and more often at least equal to 60 mm. From these three dimensions H, A and B, it is possible to define, for a given tread pattern element, a circumferential slenderness ratio H/B, an axial slenderness ratio H/A and a surface-area aspect ratio B/A which define the rigidity of the tread pattern elements.

The circumferential rows of the blocks are separated in pairs by circumferential voids. A circumferential void generally forms an angle at most equal to 30° with the circumferential direction. In other words, its central line forms a mean angle relative to the circumferential direction of the tire which is not zero but lies within the range of values [0°; 30°]. The centre line forms a smaller slope relative to the circumferential direction than relative to the axial direction. The void is not therefore strictly circumferential but generally circumferential.

The blocks of a same circumferential row are separated in pairs by transverse voids. A transverse void generally forms an angle at least equal to 60° with the circumferential direction. In other words, its central line forms a mean angle relative to the circumferential direction of the tire which is not zero but lies within the range of values [60°; 90°]. The centre line forms a greater slope relative to the circumferential direction than relative to the axial direction. The void is not therefore strictly transverse but generally transverse.

A void is delimited by the two walls of the blocks which it separates. When the blocks deform during movement into the contact patch of the tire with the ground during travel, these walls tend to move closer together and the voids they delimit close up. These deformations depend on the mechanical stresses applied to the tire during travel, which are themselves functions of usage conditions of the tire. The usage conditions (load, speed, pressure) of a tire for an agricultural vehicle are defined in standards, for example the standard of the ETRTO, or "European Tire and Rim Technical Organisation", in its "Standards Manual-2019", in the section devoted to "Agricultural equipment tires". When a tire is used under the usage conditions recommended by the standards, the block walls delimiting a void may or may not come at least partially into contact with one another, i.e. the void may or may not close up. When there is no contact between the walls, the void is called a groove. When there is at least partial contact between the walls, the void is called an incision.

A void is generally characterized geometrically by a width and a depth. The width of a void is measured perpendicularly to the middle surface of the void, positioned at an equal distance from the walls delimiting the void and level with the tread, or in some cases close thereto if there are chamfers on the opposing blocks. The depth of the void is measured perpendicularly to the tread between the opening surface and the base of the void.

According to a first essential characteristic of the invention, two consecutive blocks of the median row are separated by a transverse void with a width equal at most to 2.5 mm.

In other words, a transverse void of a median is an incision liable to close at least partially during movement into the contact patch.

As a result, the median row formed of blocks separated by incisions constitutes a quasi-continuous rib with periodic incisions, which is favorable with regard to performance in wear and rolling resistance in road use. Because of the small thickness of the median transverse voids, the volume of rubbery material of the median part which will be worn down by abrasion is large, which is favorable for the service life with respect to wear. Also, the area of the rubbery material of the median part intended to come into contact with the ground is also large, which reduces the contact pressure on the ground and hence abrasion and consequently wear. The presence of incisions facilitates the flattening of the median row of blocks in the circumferential direction, which firstly limits the slippage of the blocks on the ground and consequently the wear, and secondly limits the deformation of the rubbery material and hence the energy dissipation, which reduces rolling resistance. Also, closure of the median transverse voids in the contact patch leads to compactness of the median row of blocks, i.e. the blocks come into contact with one another which allows a reduction in deformation of the median blocks due to the Poisson effect and by shear stress. The result is less energy dissipation of the rubbery material in the blocks of the median row, which reduces rolling resistance.

Also, in the case of field usage, limiting the contact pressures (which are maximal in the centre of the tread) prevents significant compaction of the soil, which helps preserve it.

According to a second essential characteristic of the invention, the mean circumferential slenderness ratio of every block of the median row is equal to at least 0.95 and most 1.15.

A circumferential slenderness ratio of a block of the median row close to 1 is considered optimal with respect to the compromise, for the median row, between its circumferential flattening for wear and rolling resistance, and the slippage level obtained in the contact patch for braking on a wet road.

According to a third essential characteristic of the invention, every block of each intermediate row comprises a leading face, in the circumferential direction of rolling of the tire, which forms a mean angle at least equal to 30° with a radial direction of the tire.

A mean angle of the leading face of the block of the intermediate row at least equal to 30° gives an intermediate block with a high material volume and high circumferential rigidity. A high material volume guarantees a satisfactory service life with respect to wear. A high circumferential rigidity limits slippage of the block of the intermediate row in the contact patch, and hence abrasion and consequently wear. Also, the circumferential deformation of the block of the intermediate row due to the Poisson effect and shear stress, is also limited. The result is less energy dissipation of the rubbery material in the blocks of the intermediate row, which reduces rolling resistance.

In field use, a mean angle of the leading face of the intermediate row block at least equal to 30° and hence high, allows an increase in cohesion of the soil in front of and below the block, which allows a greater traction force to be developed.

According to a fourth essential characteristic of the invention,
the mean circumferential slenderness ratio of every block of each lateral row is at most equal to 0.9.

Relative to a circumferential slenderness ratio close to 1 for a tire with lugs according to the prior art, the reduction in the mean circumferential slenderness of every block of each lateral row is achieved by an increase in the circumferential length of the block, which allows a greater volume of wearing material (favorable for wear) and a high circumferential rigidity. A high material volume guarantees a satisfactory service life with respect to wear. A high circumferential rigidity limits slippage of the block of the intermediate row in the contact patch, and hence abrasion and consequently wear. Also, the circumferential deformation of the block of the intermediate row, due to the Poisson effect and shear stress, is also limited. The result is less energy dissipation of the rubbery material in the blocks of the intermediate row, which reduces rolling resistance.

Preferably, the median row has an axial width at least equal to 15% and at most equal to 25% of the axial width of the tread.

The axial width of the median row must be sufficient for the desired technical advantages relating to wear and rolling resistance in road use to be significant, but not too great, so that the function of field traction can be correctly ensured.

Advantageously, the median row has a local volumetric void ratio at most equal to 20%.

The proportion of voids of a tire is usually quantified by a total volumetric void ratio, defined as the ratio between the volume of voids and the total volume of the tread assumed to be free of voids, corresponding to the geometric volume delimited by the bearing surface and the tread surface. The total volumetric void ratio is also known as the total volumetric cut ratio. As the tread surface varies according to the degree of wear of the tread, the total volumetric void ratio will generally, although not necessarily, vary with the degree of wear. Thus, the total volumetric void ratio may be defined for the tire when new or in a given state of wear. By way of example, a tire for a driven wheel of an agricultural tractor when new has a total volumetric void ratio that is generally at least equal to 50% and often at least equal to 60%. In the following text, the expression "total volumetric void ratio" implicitly means "total volumetric void ratio when the tire is in a new state".

A local volumetric void ratio may also be defined for any tread portion that extends circumferentially over the entire circumference of the tire and extends axially from a first circumferential plane to a second circumferential plane, the distance between these two circumferential planes representing the axial width, referred to more simply as width, of the tread portion. The local volumetric void ratio is defined as being the ratio between the volume of voids and the total volume of the tread portion assumed to be free of voids, which corresponds to the geometric volume delimited by the bearing surface, the tread surface, and the two circumferential planes. The local volumetric void ratio is also known as the local volumetric cut ratio. Like the total volumetric void ratio, the local volumetric void ratio may be defined for the tire when new or in a given state of wear. In the following text, the expression "local volumetric void ratio" implicitly means "local volumetric void ratio when the tire is in a new state".

A local volumetric void ratio at most equal to 20% for the median row guarantees a significant favorable impact on performance in terms of wear and rolling resistance in road use.

Advantageously, every transverse void separating two consecutive blocks of the median row forms an angle at least equal to 70° with the circumferential direction.

The circumferential flattening of the median row is facilitated by a transverse void angle which is as close as possible to the axial direction, i.e. as close to 90° as possible. The inventors have found that an angular value of 70° is a minimal value for the efficacy of this flattening.

Further advantageously, every transverse void separating two consecutive blocks of the median row has a depth at least equal to 50%, preferably at least equal to 70%, of the mean radial height of the block.

Below 50% of the mean radial height of the block, the depth of transverse void of the median row is not sufficient to guarantee a hinge effect allowing circumferential flattening of the median row, with a significant impact on rolling resistance.

According to a particularly advantageous embodiment, every transverse void separating two consecutive blocks of the median row is extended radially inwardly by a cavity.

The presence of a cavity, usually spherical, at the base of the transverse void reduces the risk of initiation of cracking from the base of the void by avoiding a stress concentration. Also, when the wear level reaches the base of the void at the end of service life, the cavity then forms two biting edges which helps maintain a minimum adhesion on a wet road.

Advantageously, each intermediate row has an axial width at least equal to 15% and at most equal to 25% of the axial width of the tread.

This range of values for the axial width of each intermediate row guarantees effective traction in the field over a significant portion of the tread.

Further advantageously, each intermediate row has a local volumetric void ratio at least equal to 40%, preferably at least equal to 55%.

A minimum value of 40% for the local volumetric void ratio of the intermediate row is necessary for effective traction in the field.

Further advantageously, the mean circumferential slenderness ratio of every block of each intermediate row is at least equal to 0.5 and at most equal to 1.

A mean circumferential slenderness ratio of every block of the intermediate row in the value range [0.5; 1], combined with a mean angle of the leading face of said block at least equal to 30°, allows an optimal circumferential rigidity of the block relative to the compromise between the road performance in terms of wear and rolling resistance, and traction in the field.

Preferably, every block of an intermediate row comprises a leading face which forms a mean angle at least equal to 35° with a radial direction of the tire.

The larger the mean angle of the leading face of a block in the intermediate row, the greater the cohesion of the soil in front of and below the block in field usage; this allows an even greater traction force to be developed in the field.

Advantageously, each lateral row has an axial width at least equal to 15% and at most equal to 25% of the axial width of the tread.

Further advantageously, each lateral row has a local volumetric void ratio at least equal to 40%, preferably at least equal to 55%.

The combination of a lateral row with an axial width and local volumetric void ratio within the above-defined value ranges, and of an intermediate row as described above, constitutes a system of partial lugs which is effective with respect to traction in the field.

Advantageously, the mean circumferential slenderness ratio of every block of each lateral row is equal to at most 0.8.

Advantageously, the mean circumferential slenderness ratio of every block of each lateral row is equal to at least 0.6.

A mean circumferential slenderness ratio of every block of the lateral row in the value range [0.6; 0.8] allows an optimal circumferential rigidity of the block with respect to the compromise between the road performance in terms of wear and rolling resistance, and field performance in terms of traction and soil evacuation.

Further advantageously, every block of a lateral row comprises a leading face which forms a mean angle at least equal to 10° and at most equal to 30° with a radial direction of the tire.

Above a value of 30° for the mean angle of the leading face, the widths of transverse voids separating two consecutive blocks of the lateral row become too small to guarantee a sufficient traction capacity and soil evacuation (shedding) capacity. To compensate for a risk of loss of traction in the field, a reduction in the width of the transverse voids may be at least partially compensated by any increase in the depth of the transverse voids.

According to a particular embodiment, every block of a lateral row comprises a leading face and a trailing face which form, with a radial direction of the tire, mean angles which are equal in absolute values. This configuration therefore implies a symmetry of slopes of the leading faces and trailing faces of a block of the lateral row.

Preferably, each intermediate and lateral row comprises at least 26 blocks.

Further preferably, each intermediate and lateral row comprises at most 32 blocks.

The choice of the number of blocks distributed circumferentially, for every lateral or intermediate row, is the result of a compromise between road wear, depending on the volume of wearing material and the area of material in contact with the ground, and noise and vibration comfort on the road, which depend in particular on the distance separating two consecutive blocks of a same row.

BRIEF DESCRIPTION OF THE DRAWINGS

The present invention will be understood better with the aid of FIGS. 1 to 6 described below.

DETAILED DESCRIPTION OF THE DRAWINGS

Figure 1:
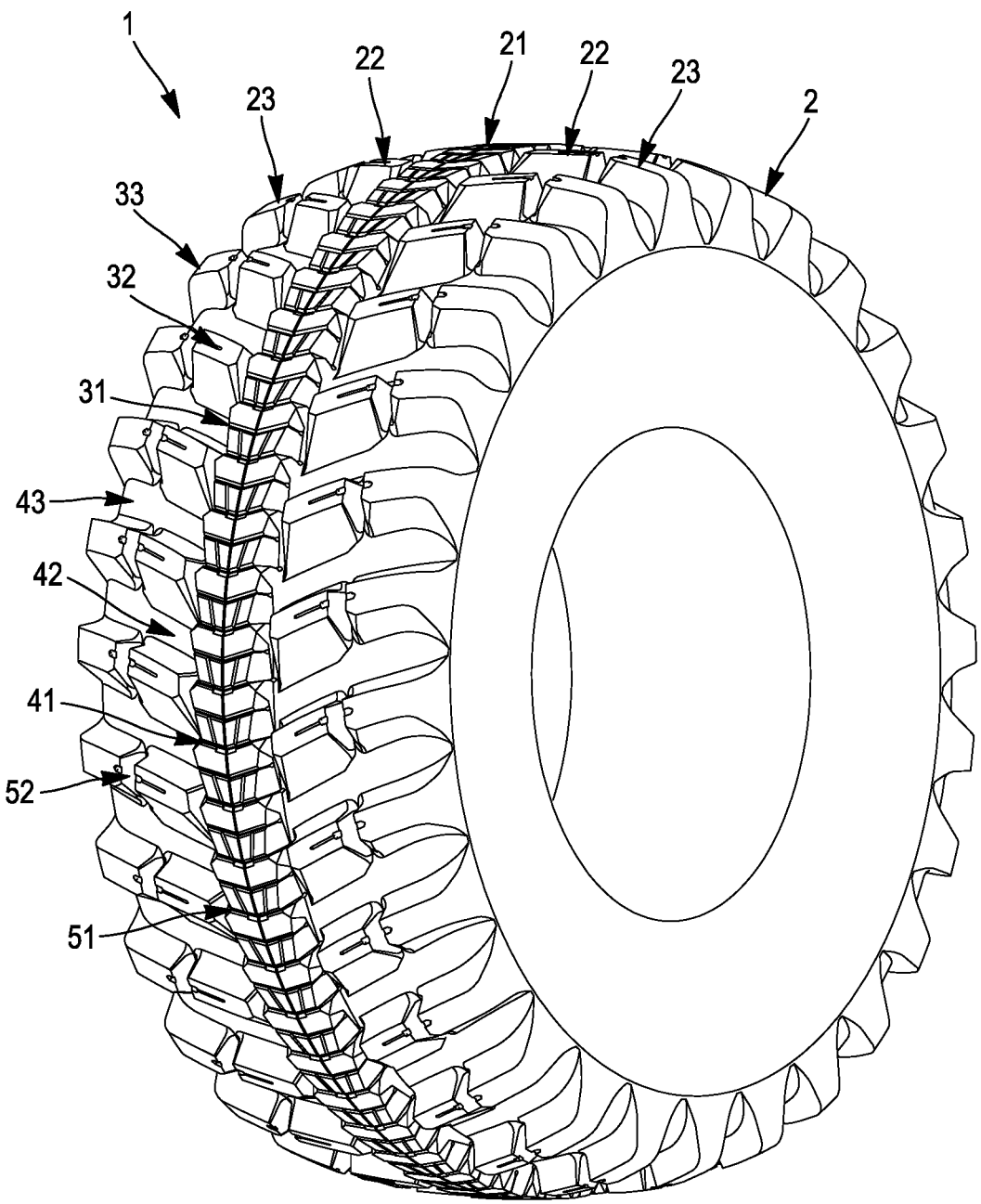
FIG. 1: shows a perspective view of a tire according to the invention.

FIG. 1 is a perspective view of a tire according to the invention. The tire 1 for an agricultural vehicle comprises a tread 2 consisting of blocks (31, 32, 33) in pairs separated by voids (41, 42, 43, 51, 52) and arranged, over the width of the tread 2, in a median row 21, two intermediate rows 22 and two lateral rows 23. The voids (41, 42, 43, 51, 52) are either transverse voids (41, 42, 43) or circumferential voids (51, 52).

Figure 2:
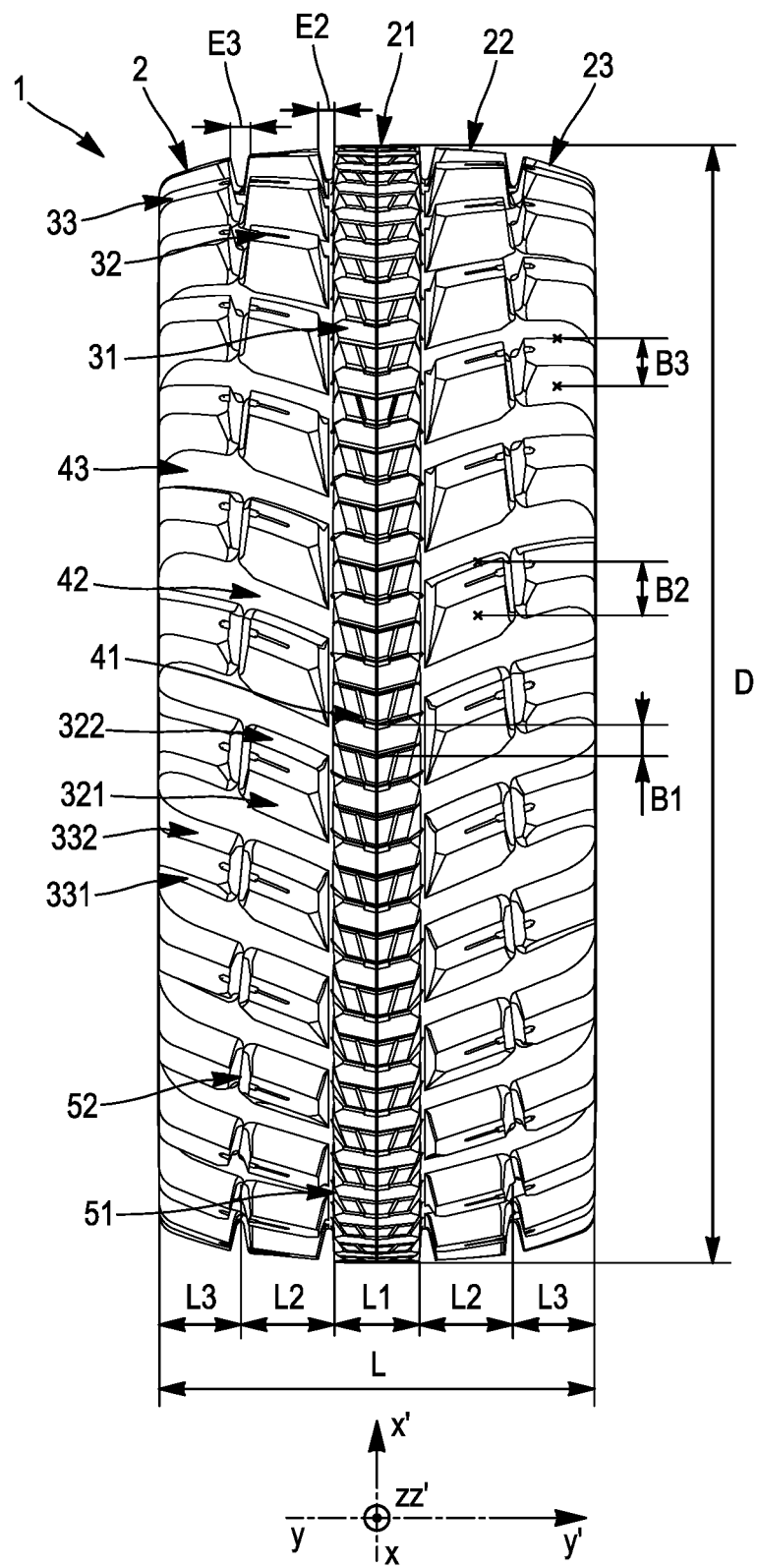
FIG. 2: shows a front view of a tire according to the invention.

FIG. 2 is a front view of a tire according to the invention; The tire 1 for an agricultural vehicle, with a diameter D in a state not mounted on a rim and not inflated, comprises a tread 2 with an axial width L in an axial direction YY' and consisting of pairs of blocks (31, 32, 33) separated by voids (41, 42, 43, 51, 52) and arranged, over the width of the tread 2, in a median row 21, two intermediate rows 22 and two lateral rows 23. The voids (41, 42, 43, 51, 52) are either transverse voids (41, 42, 43) which form an angle at least equal to 60° with a circumferential direction XX' of the tire 1, or circumferential voids (51, 52) which form an angle at most equal to 30° with the circumferential direction XX'. The median row 21 with an axial width L1 is centred on a median circumferential plane E of the tire. The two intermediate rows 22, each with an axial width L2, are axially positioned on either side of the median row 21 and separated therefrom by circumferential voids 51, each with a width E2. The two lateral rows 23, each with an axial width L3, are axially positioned respectively outside an intermediate row 22 and separated therefrom by a circumferential void 52, with a width E3. Each respective median row 21, intermediate row 22 and lateral row 23 consists of a circumferential distribution of blocks (31, 32, 33) in pairs separated by transverse voids (41, 42, 43) and each having a mean circumferential length (B1, B2, B3). The circumferential length B1 of a block 31 of the median row 21 is the circumferential distance measured between the two incision-type transverse voids 41 delimiting it. The circumferential length B2 of a block 32 of the intermediate row 22 is the mean circumferential distance measured between a leading face 321 and a trailing face 322 of said block 32. The circumferential length B3 of a block 33 of the lateral row 23 is the mean circumferential distance measured between a leading face 331 and a trailing face 332 of said block 33. The blocks 33 of a same lateral row 23 extend axially towards the outside in the extension of the blocks 32 of the adjacent intermediate row 22, such that any set of two blocks (33, 32) of the lateral row 23 and intermediate row 22 respectively, in the extension of one another, forms a lug.

Figure 3:
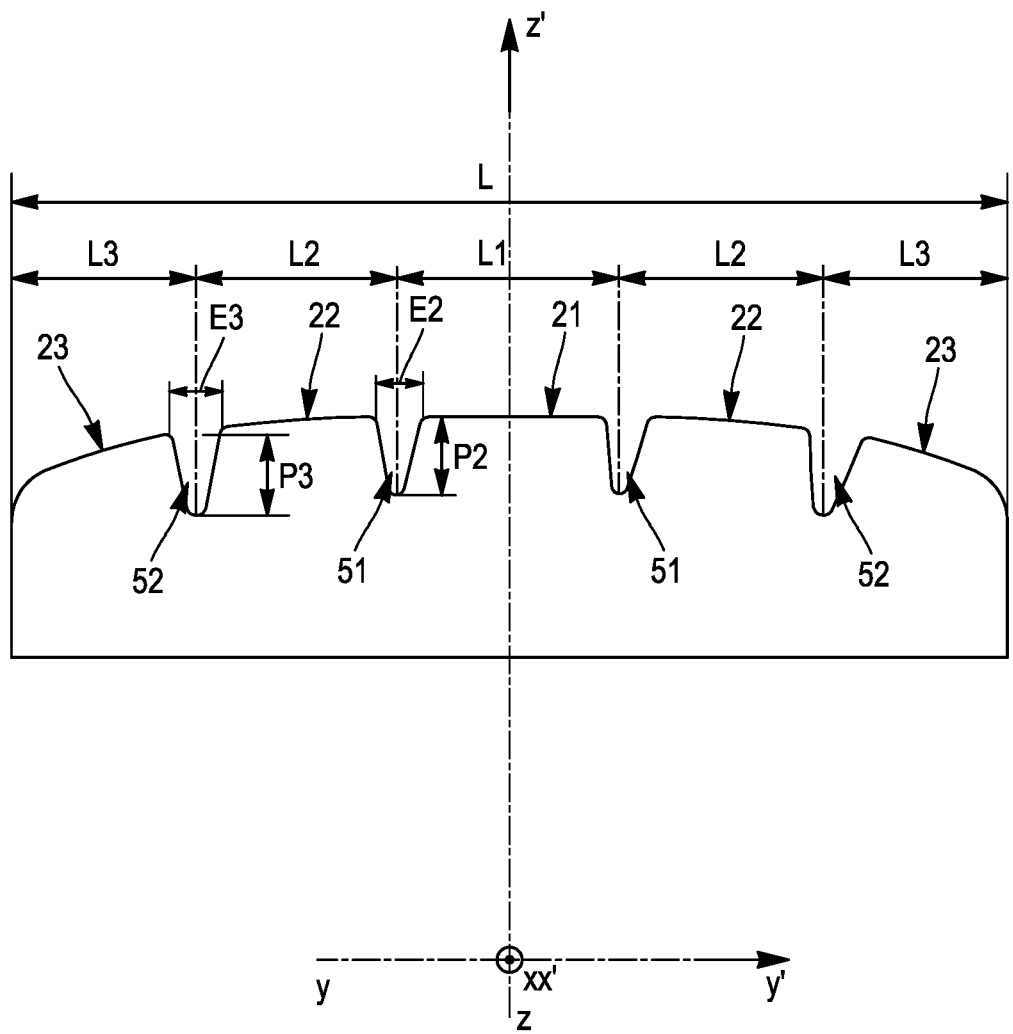
FIG. 3: shows a meridian section of a tread of a tire according to the invention.

FIG. 3 shows a meridian section of a tread of a tire according to the invention. The tread has an axial width L and is divided into a median row 21 with an axial width L1, two intermediate rows 22 each with an axial width L2, and two lateral rows 23 each with an axial width L3. Each intermediate row 22 is respectively separated from the median row 21 by a circumferential void 51 with a width E2 and a depth P2, and from the closest lateral row 23 by a circumferential void 52 with a width E3 and a depth P3.

Figure 4:
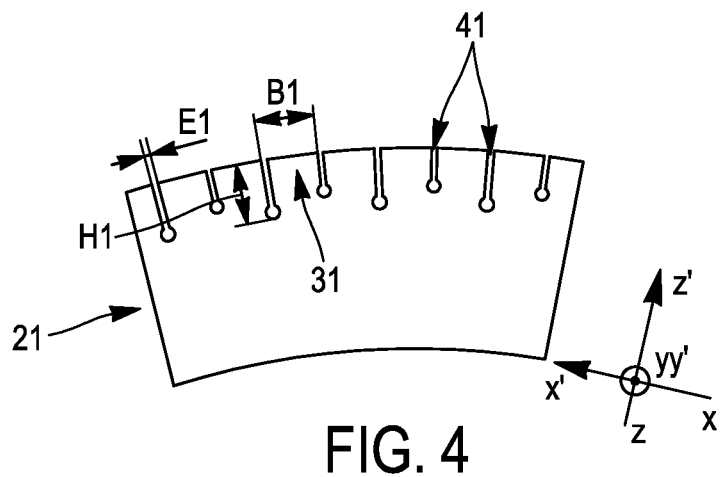
FIG. 4: shows a circumferential section of a median row portion of a tread of a tire according to the invention.

FIG. 4 shows a circumferential section, on a plane XZ, of a portion of a median row 21 of a tread of a tire according to the invention. The median row 21 consists of a circumferential distribution of blocks 31 each having a circumferential length B1 and a height H1. The blocks 31 are separated in pairs by transverse incision-type voids 41 with a width E1. According to the invention, two consecutive blocks 31 of the median row 21 are separated by a transverse void 41 with a width E1 at most equal to 2.5 mm. In the embodiment shown, transverse incisions 41 with depth H1 alternate with ones with a depth of less than H1. This choice facilitates production of the tire by reducing the force necessary for removing the tire from the mold after curing, thanks to the smaller depth of some of the transverse incisions.

Figure 5:
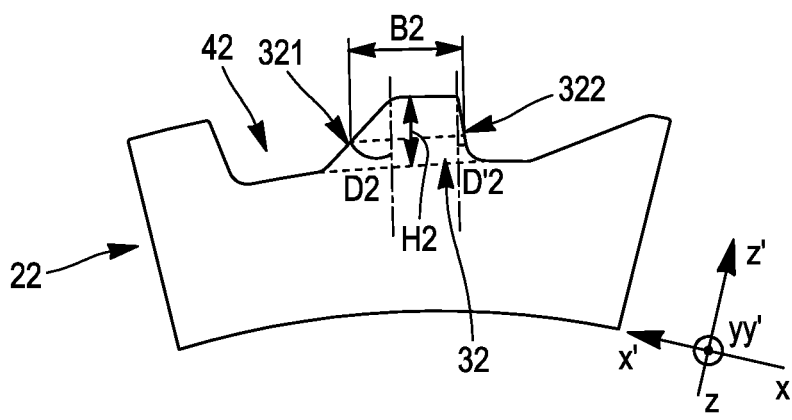
FIG. 5: shows a circumferential section of an intermediate row portion of a tread of a tire according to the invention.

FIG. 5 shows a circumferential section, on a plane XZ, of a portion of an intermediate row 22 of a tread of a tire according to the invention. The intermediate row 22 consists of a circumferential distribution of blocks 32 each with a circumferential length B2—mean distance measured between a leading face 321 and a trailing face 322—and a height H2. The blocks 32 are separated in pairs by transverse groove-type voids 42. According to the invention, every block 32 of each intermediate row 22 comprises a leading face 321 in the circumferential direction of rolling of the tire, which forms a mean angle D2 at least equal to 30° with a radial direction ZZ' of the tire, and a trailing face 322 forming a mean angle D'2 with the radial direction ZZ' of the tire.

Figure 6:
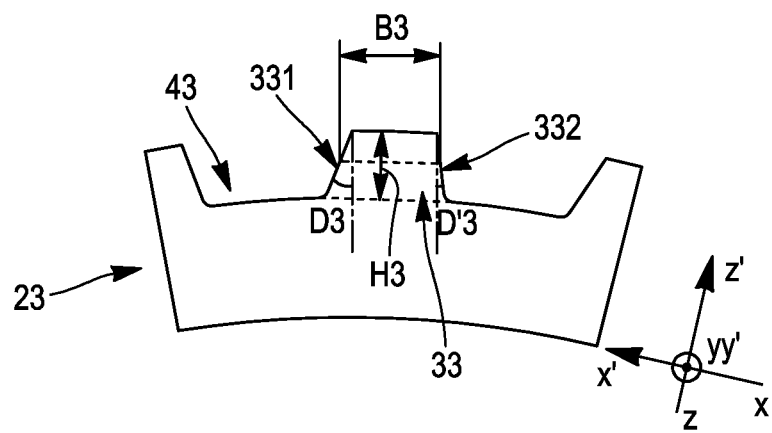
FIG. 6: shows a circumferential section of a lateral row portion of a tread of a tire according to the invention.

FIG. 6 shows a circumferential section, on a plane XZ, of a portion of a lateral row 23 of a tread of a tire according to the invention. The lateral row 23 consists of a circumferential distribution of blocks 33 each with a circumferential length B3—mean distance measured between a leading face 331 and a trailing face 332—and a height H3. The blocks 33 are separated in pairs by transverse groove-type voids 43. According to the invention, the mean circumferential slenderness ratio of every block 33 of each lateral row 23 is at most equal to 0.9. Also, every block 33 of each the lateral row 23 comprises a leading face 331 in the circumferential direction of rolling of the tire, which forms a mean angle D3 at least equal to 10° and at most equal to 30° with a radial direction ZZ' of the tire, and a trailing face 332 forming a mean angle D'3 with the radial direction ZZ' of the tire.

The invention has been studied more particularly in the case of an agricultural tire of size 600/70 R 30.

Table 1 below presents the technical features of a preferred exemplary embodiment of the invention, as shown in FIGS. 1 to 6.

TABLE 1

| Geometric features | Values | Comments |
| --- | --- | --- |
| Axial width L of the tread 2 | 606 mm | |
| External diameter D of tire | 1609 mm | Measured on the tire not fitted on the rim and not inflated |
| Axial width L1 of the median row 21 | 124 mm | 124/606 = 20% of L => Between 15% and 25% of L |
| Axial width L2 of each intermediate row 22 | 115 mm | 115/606 = 19% of L => Between 15% and 25% of L |
| Axial width L3 of each lateral row 23 | 104 mm | 115/606 = 19% of L => Between 15% and 25% of L |
| Total volumetric void ratio of tread 2 | 53% | |
| Local volumetric void ratio of median row 21 | 11% | Less than 20% |
| Local volumetric void ratio of each intermediate row 22 | 64% | More than 55% |
| Local volumetric void ratio of each lateral row 23 | 63% | More than 55% |
| Mean radial height H1 of a block 31 in median row 21 | 48 mm | |
| Mean circumferential length B1 of a block 31 in median row 21 | 43 mm | |
| Circumferential slenderness ratio H1/B1 of a block 31 in median row 21 | 1.12 | Between 0.95 and 1.15 |
| Width E1 of a transverse void 41 between two consecutive blocks 31 in median row 21 | 1.6 mm | Less than 2.5 mm => Incision |

TABLE 1-continued

| Geometric features | Values | Comments |
|---|---|---|
| Depth of transverse void 41 between two consecutive blocks 31 in median row 21 | 48 mm | Equal to height H1 of block |
| Depth of secondary transverse incision 411 in a block 31 in median row 21 | 31 | Equal to 70% of height H1 of block |
| Mean angle of transverse void 41 between two consecutive blocks 31 in median row, relative to circumferential direction XX4 | 75° | Greater than 60° |
| Mean radial height H2 of a block 32 in intermediate row 22 | 46 mm | |
| Mean circumferential length B2 of a block 32 in intermediate row 22 | 71 mm | |
| Circumferential slenderness ratio H2/B2 of a block 32 in intermediate row 22 | 0.65 | Between 0.5 and 1 |
| Mean angle D2 of leading face 321 of block 32 in intermediate row 22 | Between 34° and 45° | Greater than 30° |
| Mean angle of transverse void 42 between two consecutive blocks 32 in intermediate row 22, relative to circumferential direction | 67° | Greater than 60° |
| Mean radial height H3 of a block 33 in lateral row 23 | 46 mm | |
| Mean circumferential length B3 of a block 33 in lateral row 23 | 64 mm | |
| Circumferential slenderness ratio H3/B3 of a block 33 in lateral row 23 | 0.72 | Less than 0.9, preferably between 0.6 and 0.8. |
| Mean angle D3 of leading face 331 of block 33 in lateral row 23 | Between 20° and 28° | Greater than 10° and less than 30° |
| Mean angle of transverse void 43 between two consecutive blocks 33 in lateral row 23 | 75° | Greater than 60° |
| Number of blocks N of an intermediate row 22 or lateral row 23 (over entire circumference of tire) | 28 | Between 26 and 32 |
| Width E2 of intermediate circumferential void 51 | 131 mm | At level of tread surface in new condition |
| Depth P2 of intermediate circumferential void 51 | 46 mm | |
| Width E3 of intermediate circumferential void 52 | 121.5 mm | At level of tread surface in new condition |
| Depth P3 of intermediate circumferential void 52 | 46 mm | |

The inventors have compared, by digital simulation and/or internal testing, the performance levels according to the invention and those of a reference tire 600/70 R 30 Michelin MACHXBIB. The rolling resistance in road use for a tire subjected to a load Z=3801 Kg, inflated to a pressure P=1.8 bar and travelling at a speed V=15 km/h, was reduced from 14.8 kg/t for the reference tire to 11.6 kg/t for the tire according to the invention, or a reduction of 21%. The service life in terms of wear, defined as the mileage travelled on the road before removal of the fully worn tire, for the tire according to the invention, is 20% greater than that of the reference tire.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A tire for an agricultural vehicle, comprising a tread with an axial width (L) and consisting of pairs of blocks separated by voids and arranged, over the width of the tread, in a median row, two intermediate rows and two lateral rows, the voids being either transverse voids which form an angle at least equal to 60° with a circumferential direction (XX') of the tire, or circumferential voids which form an angle at most equal to 30° with the circumferential direction (XX'), the median row being centred on a median circumferential plane (E) of the tire, the two intermediate rows being positioned axially on either side of the median row and separated therefrom by circumferential voids, and the two lateral rows being positioned respectively axially outside an intermediate row and separated therefrom by a circumferential void, each median row, intermediate row and lateral row comprising a circumferential distribution of pairs of blocks separated by transverse voids and each having a mean radial height (H1, H2, H3), a mean circumferential length (B1, B2, B3) and a mean circumferential slenderness ratio defined as the ratio between the mean radial height and the mean circumferential length of the block, the blocks of a same lateral row extending axially towards the outside in the extension of the blocks of the adjacent intermediate row, such that any set of two blocks of the lateral row and intermediate row respectively, in the extension of one another, forms a lug, wherein two consecutive blocks in the median row are separated by a transverse void with a width (E1) equal at most to 2.5 mm, the mean circumferential slenderness ratio of any block in the median row is at least equal to 0.95 and at most equal to 1.15, and every block of each intermediate row comprises a leading face in the circumferential rolling direction of the tire which forms a mean angle (D2) equal at least to 30° with a radial direction (ZZ') of the tire, and wherein the mean circumferential slenderness ratio of any block (33) in each lateral row (23) is at most equal to 0.9.

2. The tire as claimed in claim 1, wherein the median row has an axial width (L1) at least equal to 15% and at most equal to 25% of the axial width (L) of the tread.

3. The tire as claimed in claim 1, wherein the median row has a local volumetric void ratio at most equal to 20%.

4. The tire as claimed in claim 1, wherein every transverse void separating two consecutive blocks of the median row forms an angle at least equal to 70° with the circumferential direction (XX').

5. The tire as claimed in claim 1, wherein every transverse void separating two consecutive blocks of the median row has a depth (P1) at least equal to 50% of the mean radial height (H1) of the block).

6. The tire as claimed in claim 1, wherein every transverse void separating two consecutive blocks of the median row is extended radially inwardly by a cavity.

7. The tire as claimed in claim 1, wherein each intermediate row has an axial width (L2) at least equal to 15% and at most equal to 25% of the axial width (L) of the tread.

8. The tire as claimed in claim 1, wherein each intermediate row has a local volumetric void ratio at least equal to 40%.

9. The tire as claimed in claim 1, wherein the mean circumferential slenderness ratio of every block of each intermediate row is at least equal to 0.5 and at most equal to 1.0.

10. The tire as claimed in claim 1, wherein every block of an intermediate row comprises a leading face which forms a mean angle (D2) at least equal to 35° with a radial direction (ZZ') of the tire.

11. The tire as claimed in claim 1, wherein each lateral row has an axial width (L3) at least equal to 15% and at most equal to 25% of the axial width (L) of the tread.

12. The tire as claimed in claim 1, wherein each lateral row has a local volumetric void ratio at least equal to 40%, preferably at least equal to 55%.

13. The tire as claimed in claim 1, wherein the mean circumferential slenderness ratio of every block) of each lateral row is at most equal to 0.8.

14. The tire as claimed in claim 1, wherein the mean circumferential slenderness ratio of every block of each lateral row is at least equal to 0.6.

15. The tire as claimed in claim 1, wherein every block of a lateral row comprises a leading face which forms a mean angle (D3) at least equal to 10° and at most equal to 30° with a radial direction (ZZ') of the tire.

16. The tire as claimed in claim 1, wherein every block of a lateral row comprises a leading face and a trailing face which form, with a radial direction (ZZ') of the tire, mean angles (D3, D'3) which are equal in absolute values.

17. The tire as claimed in claim 1, wherein the circumferential distribution of blocks of each intermediate row and lateral row comprises at least twenty-six blocks.

18. The tire as claimed in claim 1, wherein the circumferential distribution of blocks of each intermediate row and lateral row comprises at most 32 blocks.

* * * * *